US011773650B2

(12) United States Patent
Betz et al.

(10) Patent No.: US 11,773,650 B2
(45) Date of Patent: Oct. 3, 2023

(54) METHOD FOR ERECTING A TOWER, TOWER SEGMENT, SUPPLY STRUCTURE, AND TOWER

(71) Applicant: MAX BÖGL WIND AG, Sengenthal (DE)

(72) Inventors: Thorsten Betz, Neumarkt (DE); Stefan Bögl, Sengenthal (DE)

(73) Assignee: Max Bögl Wind AG, Sengenthal (DE)

( * ) Notice: Subject to any disclaimer, the term of this patent is extended or adjusted under 35 U.S.C. 154(b) by 113 days.

(21) Appl. No.: 16/756,936

(22) PCT Filed: Oct. 15, 2018

(86) PCT No.: PCT/EP2018/077998
§ 371 (c)(1),
(2) Date: Apr. 17, 2020

(87) PCT Pub. No.: WO2019/076786
PCT Pub. Date: Apr. 25, 2019

(65) Prior Publication Data
US 2021/0189801 A1  Jun. 24, 2021

(30) Foreign Application Priority Data
Oct. 20, 2017 (DE) .................. 10 2017 124 615.0

(51) Int. Cl.
*E06C 9/12* (2006.01)
*F03D 80/80* (2016.01)
(Continued)

(52) U.S. Cl.
CPC .............. *E06C 9/12* (2013.01); *E04H 12/342* (2013.01); *E06C 1/34* (2013.01); *E06C 1/383* (2013.01); *E06C 9/085* (2013.01); *F03D 80/80* (2016.05)

(58) Field of Classification Search
CPC .......... F03D 80/88; F03D 80/80; E06C 1/383; E06C 9/085; E06C 1/34; E06C 9/12; E04H 12/342
See application file for complete search history.

(56) References Cited

U.S. PATENT DOCUMENTS 3,757,896 A * 9/1973 Lee ........................... E06C 1/56
182/164
8,935,889 B2 * 1/2015 Samuelsen .............. F03D 80/00
52/745.04
(Continued)

FOREIGN PATENT DOCUMENTS

CN 203271580 U 11/2013
CN 205602948 U 9/2016
(Continued)

OTHER PUBLICATIONS

Chinese Patent Office Examination Report with English Translation, dated Aug. 3, 2021.
(Continued)

*Primary Examiner* — Andrew J Triggs
(74) *Attorney, Agent, or Firm* — JK Intellectual Property Law, PA

(57) ABSTRACT

A tower segment for at least a section of a tower includes a tower segment defining an interior, a longitudinal axis, and a wall, and a supply structural segment preassembled in the interior of the tower segment extending along a the longitudinal axis of the tower segment. The supply structural segment is movable relative to the tower segment and connected to the wall of the tower segment so that the supply structural segment can be moved at least from an assembly position to a connecting position. Other tower, tower segment, support structure, support structural segment, and methods of erection of same use at least a tower segment of a tower.

17 Claims, 7 Drawing Sheets

(51) Int. Cl.
*E04H 12/34* (2006.01)
*E06C 1/34* (2006.01)
*E06C 1/383* (2006.01)
*E06C 9/08* (2006.01)

(56) References Cited

U.S. PATENT DOCUMENTS

| | | | |
|---|---|---|---|
| 9,500,027 B2 * | 11/2016 | Walter | E06C 7/08 |
| 10,047,725 B2 * | 8/2018 | Yenser | F03D 80/80 |
| 10,260,284 B2 * | 4/2019 | Lockwood | E06C 7/505 |
| 10,443,205 B2 | 10/2019 | Menzel | |
| 10,538,936 B2 | 1/2020 | Knitl et al. | |
| 2010/0154351 A1 * | 6/2010 | Messenburg | E04H 12/08 |
| | | | 416/244 R |
| 2015/0292263 A1 | 10/2015 | Hierl | |
| 2015/0361679 A1 * | 12/2015 | Kent | E04G 3/243 |
| | | | 182/87 |
| 2016/0215520 A1 * | 7/2016 | Samuelsen | F03D 13/10 |
| 2016/0237985 A1 | 8/2016 | Bögl et al. | |
| 2021/0189801 A1 * | 6/2021 | Betz | E04H 12/12 |

FOREIGN PATENT DOCUMENTS

| | | |
|---|---|---|
| CN | 206329447 U * | 7/2017 |
| CN | 206329447 U | 7/2017 |
| DE | 10 2007 020 483 A1 | 10/2008 |
| DE | 10 2012 108 120 A1 | 10/2013 |
| WO | WO 2017/039915 A1 | 3/2017 |
| WO | WO 2019025505 A1 | 2/2019 |

OTHER PUBLICATIONS

German Search Report for Application No. 10 2017 124 615.0, dated Aug. 3, 2018.
International Search Report for Application No. PCT/EP2018/077998, dated Jan. 18, 2019.

* cited by examiner

METHOD FOR ERECTING A TOWER, TOWER SEGMENT, SUPPLY STRUCTURE, AND TOWER

CROSS-REFERENCE TO RELATED APPLICATIONS

This application is a national stage of International Application No. PCT/EP2018/077998, filed Oct. 15, 2018, and claims benefit to German Patent Application No. 10 2017 124 615.0, filed Oct. 20, 2017, both of which are incorporated by reference herein.

TECHNICAL FIELD

The present disclosure relates to a method for erecting a tower, especially a wind turbine tower, consisting of several tower segments, in which in each case an upper tower segment of the several tower segments is arranged together with a supply structural segment preassembled therein on top of a lower tower segment of the several tower segments with a supply structural segment preassembled therein until a target height of the tower is reached, and in which the supply structural segments are connected simultaneously with the tower assembly to form a supply structure extending along the target height of the tower. Furthermore, the disclosure relates to a tower segment for a tower, a supply structure for a tower as well as to a tower.

The present disclosure additionally relates to a method for erecting a supply structure in the interior of a tower, especially of a wind turbine tower consisting of several tower segments, wherein the supply structure consisting of several supply structural segments, which are arranged on top of one another and linked together, is erected. Furthermore, the disclosure relates to a supply structure and a tower.

BACKGROUND

A supply structure for a tower in form of a ladder installation consisting of several ladder segments is known from WO 2017/039915 A1. Such supply structures are used for wind turbine towers in the state of the art so interior installations such as ladders, cables, lighting, elevators and the like can be fastened to the tower. The ladder segments of WO 2017/039915 A1 are in each case preassembled in a tower segment of the tower in a slightly movable way so they can be linked together more easily after the tower segments have been placed on top of one another. The disadvantage here is that when the individual tower segments are placed on top of one another, the ladder segments can interfere with the work or assembly scaffoldings to be used, for example. Therefore, when the tower is being assembled or erected, utmost care must be exercised to prevent damage to the ladder segment.

SUMMARY

The task of the present disclosure is therefore to establish a method for erecting a tower, a tower segment and a supply structure that facilitate the installation of a supply structure in the tower. In addition, a corresponding tower should be suggested.

The task underlying the disclosure is solved by means of the features of the following disclosure. Additional advantageous designs result from the disclosure and drawings.

A method for erecting a tower, especially a wind turbine tower consisting of several tower segments, is suggested. Here, the term "tower" also extends not only to a tower section manufactured from tower segments, but also to additional tower sections made of steel or built in another way, for example, arranged above or below the tower section made of tower segments. In a top view, the tower segments can be executed in a polygonal, circular or circular segment shape and be preferably ring-shaped or ring segment-shaped precast concrete elements whose inclinations or conicities can also vary. In order to erect the tower or tower section, an upper tower segment is in each case arranged on a lower tower segment of the several tower segments. A supply structural segment has been preassembled in the upper and lower tower segment. The supply structural segment preferably supports supply lines for the interior installations, especially a ladder, an elevator arrangement, especially an elevator cabin with lifting ropes or brackets that serve to suspend and/or steer the elevator, sub-structures for cable arrangements, platforms and illumination units. The arrangement of the tower segments on top of one another is preferably repeated until the tower reaches a target height. The supply structural segments are fastened to a supply structure extending along a height of the tower.

The supply structural segment of the upper tower segment is arranged in an assembly position in the upper tower segment. This can take place both after the supply structural segments have been preassembled only at the tower's construction site by moving the supply structural segment to the assembly position and also during or after the preassembly or during the delivery to the construction site. Preferably, however, the supply structural segment is directly preassembled in the assembly position in the tower segment. Then, when the tower is being assembled, the upper tower segment is arranged on the lower tower segment and afterwards the supply structural segment is moved from the assembly position to a connecting position. In the connecting position, the supply structural segment is connected to the supply structural segment preassembled in the lower tower segment. Preferably, this already achieves the load-carrying connection which will be needed in the final state or when the supply structure is used. Preferably, the lower end of the upper supply structural segment is connected to the upper end of the supply structural segment preassembled in the lower tower segment, so that these ends form a connecting point. In the assembly position, the supply structural segment is arranged in such a way in the tower segment, especially in its interior, that when placed on top it does not interfere with the tower segment below.

In the assembly position, it is advantageous if—with regard to a longitudinal axis of the upper tower segment—the upper end of the supply structural segment of the upper tower segment projects at most above an upper edge or the supply structural segment is preferably completely arranged inside the upper tower segment. With regard to a longitudinal axis of the tower segment, the supply structural segment is thus held in the assembly position, in any case above a lower edge of the upper tower segment, so that the supply structural segment does not protrude from below the lower edge of the upper tower segment. Thus, the upper tower segment can preferably be lifted laterally above the lower tower segment without a risk of damaging the supply structural segment arranged therein.

The tower is preferably erected from bottom to top, which is why the assembly of the interior installation conceptual design or supply structure can take place chronologically parallel to the tower assembly, thereby significantly accelerating the assembly.

It is advantageous if—with regard to a longitudinal axis of the tower segments arranged on top of one another or to the already erected tower or tower section—the lower end of the supply structural segment of the upper tower segment is in the connecting position in the area of the horizontal joint. When the tower is being assembled, it is always necessary to provide for an assembly platform in the area of the horizontal joint so the two tower segments can be attached to each other. For example, the assembly platform can be a working platform that can be climbed with the tower. It can then also be used to attach the supply structural segments preassembled in the tower segments at the connecting point.

According to an advantageous execution, the lower end of the supply structural segment of the upper tower segment projects above a lower edge of the upper tower segment, thereby facilitating the joining with the supply structural segment below. Thus, the supply structural segment is held below the lower edge of the upper tower segment and thus also below an upper edge of the lower tower segment. In this connecting position, the two supply structural segments of both tower segments can be easily joined together, especially screwed together, from an assembly platform. Alternately, however, it is naturally also possible that the lower end of the supply structural segment of the upper tower segment is slightly above the lower edge of the upper tower segment in the connecting position. In any case, it is advantageous if the connecting point of both supply structural segments is located in the easily accessible area of the horizontal joint—as seen from an assembly platform—i.e. exactly at the height of the horizontal joint or a little below or above. It is conceivable to arrange a connecting piece between the two supply structural segments.

It is advantageous if after a target height of the tower is reached, the supply structural segments to be joined together to the supply structure are moved to a use position, especially lifted to the use position. To reach the target height of the tower, several tower segments are arranged on the respectively already erected section of the tower or on the lower tower segment, similarly to the upper tower segment described above. The target height is reached when a predetermined number of tower segments that corresponds to the target height has been arranged on top of one another. The supply structural segments are preferably lifted only in the use position until all supply structural segments have been joined together in the connecting position. In this way, this step must be performed only once. Preferably, in the use position, the supply structural segments are parallel to a wall of the tower segment assigned to them.

In the use position, the supply structural segment is preferably at a greater distance to the wall of the tower segment or tower than in the connecting position. This greater distance provides sufficient clearance between supply structure and tower wall, which allows the tower to be climbed with the ladder and supply lines fastened to the supply structure or working on the tower with the elevators fastened to the supply structure. Conversely, the fact that the supply structural segment is closer to the wall in the connecting position, facilitates the arrangement of an assembly platform in the interior of the tower or tower segment.

However, according to an alternative execution, it is likewise also possible for the supply structural segments to be already in the use position after they are moved to the connecting position, i.e. the connecting position is simultaneously the use position. It is advantageous here that an additional step for moving the supply structural segments to a separate use position can be dispensed with. Nevertheless, in this case it may be hard to place the tower segments on top of one another because the supply structural segments can interfere with the working or assembly scaffoldings or could even damage them, for example.

It is advantageous if the supply structural segment is swiveled by at least one joint to move it from the assembly position to the connecting position and/or the use position. The joint is preferably executed between the supply structural segment and the wall of the tower segment, so that the supply structural segment can be swiveled opposite the tower segment. By preassembling the tower segment with the supply structural segment in the assembly position in the factory, the tower segment can be easily placed on the lower tower segment without having to consider protruding structural parts. The joint allows the supply structural segment to be swiveled to the use position without additional structural parts.

After moving the supply structure to the use position, it is advantageously fastened to the uppermost tower segment and/or to a structural part arranged on the uppermost tower segment, especially to an adapter piece. The supply structure is preferably fastened while suspended. The entire supply structure, which consists of several supply structural segments joined to one another, is lifted in one step for this and fastened in one step in this used position while suspended. Alternatively, however, it is also possible to fasten the entire supply structure in standing position, especially on a foundation of the tower or tower section. It is furthermore conceivable not to fasten the entire supply structure but at least a few of the supply structural segments to the tower segments assigned to them by means of one or several fastening struts, for example.

After the supply structure has been fastened, another lowermost supply structural segment is advantageously arranged on a lower end of the supply structure. This supply structural segment continues the supply structure up to a surface of the foundation. The lowermost supply structural segment are preferably inserted after the supply structure was placed into its use position. In case the supply structure is fastened in standing position, the additional supply structural segment also serves to stabilize the entire supply structure.

It is furthermore advantageous if the lower end of the supply structural segment forms a connecting point with the upper end of the supply structural segment preassembled in the lower tower segment and a tolerance compensation element is provided at the connecting point. The connecting of the supply structural segments is thereby facilitated and when the supply structural segments are preassembled in the tower segments only relatively generous tolerance specifications must be observed. If a connecting piece is arranged between the two supply structural segments, then the tolerance compensation element can be arranged in this intermediate piece. In the easiest scenario, the tolerance compensation element can contain elongated holes in the structural parts of the supply structural segments to be linked together or also have components engaging into one another in telescope-like fashion. Tolerance specifications for the use position of the supply structure like fall protection system tolerances, for example, are thus automatically considered when the supply structural segments are being attached.

Furthermore, a tower segment for a tower, especially for a wind turbine tower, is suggested. The tower segment is executed according to the previous and/or subsequent description, wherein the aforementioned features can be present individually or in any combination. The tower segment has a supply structural segment preassembled in an interior of the tower segment and extends along a longitudinal axis of the tower segment. In a cylindrical tower, the longitudinal axis runs parallel to its wall, and in a conical tower, at an angle of up to 15° to the wall.

The tower segment is movable relative to the supply structural segment, especially in swiveling fashion, connected to a wall of the tower segment. Preferably, the supply structural segment is connected to an inner wall of the tower segment and arranged in its interior. Thanks to the movable arrangement of the supply structural segment, the latter can at least be moved from an assembly position to a connecting position.

Preferably, in the connecting position, a lower end of the supply structural segment projects above a lower edge of the tower segment. According to an alternative execution, in the connecting position, the lower end of the supply structural segment is just above the lower edge of the tower segment. Thus, when the tower and supply structure are assembled as described above, the connecting point of the two supply structural segments to be attached lies in the horizontal strut area and is therefore easily accessible.

In the assembly position, on the other hand, the supply structural segment is either arranged fully inside the tower segment or an upper end of the supply structural segment projects above an upper edge of the tower segment. This prevents structural parts of the supply structure from projecting downwards out of the tower segment and impeding assembly when the tower segment is assembled onto a lower tower segment.

The tower segment is preferably fully equipped from the factory and delivered with the supply structural segments. With additional structural parts, the tower segment can be preferably equipped before or after the tower is erected. In the tower segment, preferably no structural part projects above the wall or upper side of the tower segment in the assembly position, so that when several tower segments are placed on top of each other, no structural parts can be accidentally damaged. Furthermore, this facilitates the manufacturing of the tower segments.

Moreover, the supply structural segment is advantageously movable in a use position. According to a first execution, the supply structural segment is fully arranged inside the tower segment in the use position, so that it neither projects above the upper edge nor lower edge of the tower segment. According to another execution, the supply structural segment is arranged in such a way in the use position that it projects above the lower edge or upper edge of the tower segment. The connecting point of two supply structural segments arranged on top of one another is in the tower segment above when the upper edge of the tower segment projects above and in the tower segment below when the lower edge of the tower segment projects above.

Preferably, the supply structural segment extends parallel to the wall of the tower segment in the use position, wherein the inclination of the wall of the tower segments can also vary. In the connecting position, it is also advantageous if the supply structural segment therefore extends section by section parallel to the wall of the tower segment in order to facilitate the mounting of an assembly platform and the connection of the tower segments and supply structural segments. However, as already described, it is advantageous if the supply structural segment in the use position is at a greater distance from the wall than in the connecting position. Depending on the type of construction or varying over the height of the tower, the supply structural segment in the assembly position can extend both parallel and at an angle to the wall of the tower segment assigned in each case to the supply structural segment. In the assembly position, it is important that the supply structural segment does not project above the lower edge of the tower segment.

The supply structural segment is advantageously fastened to the wall of the tower segment with at least one joint, which movably links the supply structural segment to the tower segment, especially its inner wall.

The supply structural segment is advantageously fastened to the tower segment with at least one fastening strut. The fastening strut is preferably attached to the supply structural segment by means of a first joint and preferably to the wall of the tower segment by means of a second joint. The first joint allows the supply structural segment to be swiveled relative to the fastening strut. The second joint allows the fastening strut, which is preferably connected to the supply structural segment, to be swiveled relative to the wall of the tower segment. If necessary, both joints can be locked so that a certain position of the fastening struts can be taken relative to the wall and/or supply structural segment.

In the connecting position, the advantageously at least one fastening strut encloses an acute angle with the longitudinal axis of the tower segment, especially an angle between 3° and 10°, preferably an angle of 5°. If the fastening struts are inclined in the connecting position around this angle relative to the tower wall towards the middle or axis of the tower, this facilitates the swiveling to the use position, thereby preventing a tilting of the supply structural segments on the fastening struts.

It is furthermore advantageous if a tolerance compensation element, especially a guidance system, is executed between the at least one fastening strut and the supply structural segment. This facilitates the attachment of the supply structural segments preassembled in the tower segments to the connected supply structure, even if due to production and assembly tolerances the position of the individual supply structural segments deviates with respect to the wall of the tower segments. This also applies to deviating, i.e. non-linear tower geometries. Especially in connection with another tolerance compensation element at the connecting point of two adjoining supply structural segments, production and assembly tolerances can be largely compensated here and different tolerance systems and specifications implemented.

Advantageously, the supply structural segment is rigidly held in the assembly position by a temporary fastening element. The fastening element preferably extends in the interior of the tower segment, from its inner wall perpendicularly to the longitudinal axis into the interior. On its wall opposite the wall, the fastening element is able to hold the supply structural segment in the assembly position. So the supply structural segment can be moved or swiveled from the assembly position to the connecting position, the fastening element is detached from the supply structural segment or tower segment.

According to an advantageous further development of the disclosure, the supply structural segment and the fastening strut(s) in the use position also enclose a clearance with the wall. Due to the wall and the supply structural segment being opposite the wall in the use position, the clearance is limited and on at least one side, is delimited by the at least one fastening strut. Preferably, two fastening struts arranged opposite one another are provided, so that the clearance is limited to four sides and has a largely rectangular cross section. On the side of the supply structural segment facing away from the clearance or on at least one side outside of the clearance, at least one cable duct or another space for receiving a supply line has been arranged. Thus, the cables can be pulled from the exterior relatively easily, i.e. outside of the clearance, to the supply structure and fastened to it with the cable duct. It is therefore not necessary to thread the cables through the relatively narrow and additionally inclined clearance between supply structure and wall. Naturally, all elements like cables, fiber optic cables, etc. running in the tower from top to bottom can be fastened in this way. The cable ducts can be easily executed as cable clamps.

A supply structure for a tower or tower segment, especially for a wind turbine tower, is additionally suggested. The supply structure has at least one supply structural segment and at least one fastening strut for fastening the supply structural segment to a tower segment of the tower. The fastening strut is attached to the supply structural segment by means of at least one first joint. The fastening strut has at least one second joint for movably attaching the fastening strut to a wall of the tower segment. The tower segment is executed according to the previous description, wherein the aforementioned features can be present individually or in any combination.

The supply structure supports supply lines for internal installations, especially a ladder, an elevator arrangement, especially an elevator cabin with lifting ropes, cables, platforms and lighting units. The supply structure can be arranged inside the tower and extends along the height of the tower. Here, the supply structure consists of several supply structural segments arranged on top of one another and joined to each other. The individual supply structural segments are preferably joined together in a connecting position and lifted jointly to a use position. The supply structure allows the tower to be built with only a few steps.

Advantageously, the supply structural segment is executed as ladder segment able to directly support additional internal installations. However, the supply structural segment can also contain a scaffolding segment on which a ladder segment and other internal installations can be arranged. Preferably, the ladder segment contains a fall protection device.

It is furthermore advantageous if a tolerance compensation element, especially a guidance system, is executed between the at least one fastening strut and the supply structural segment. As a result of this, production and assembly tolerances of the supply structural segments and/or the respective tower segments can be compensated.

Furthermore, a supply structure for a tower, especially for a wind turbine tower consisting of several tower segments with several supply structural segments joined together is suggested. In each case, two supply structural segments of the several supply structural segments are joined to one another by means of joints, so that the supply structure can be folded together to an assembly position and/or unfolded to a use position. In the assembly position, the several supply structural segments lie essentially flat on top of each other. In the use position, the several supply structural segments adjoin one another with regard to their longitudinal direction.

The tower is preferably built in its entirety before the supply scaffolding is added. Alternately, the supply scaffolding is preferably placed on the foundation of the tower before the tower is erected by placing several tower segments on top of one another. Once the tower is erected, the constructive design of the supply scaffolding allows the latter to be pulled apart like an accordion in the erected tower and preferably be fixed on an adapter platform of the tower.

It is advantageous if the supply structural segments are executed as ladder segments or scaffolding segments because further internal installations can be easily fastened to them.

The last-mentioned supply structure is also advantageous if the joints are executed as double joints.

A method for erecting a supply structure in the interior of a tower, especially of a wind turbine tower consisting of several tower segments, is also suggested. The supply structure is erected from several supply structural segments that are arranged on top of each other and joined together. The supply structure is introduced into the interior of the tower in a folded assembly position and then pulled to an unfolded use position. In the assembly position, the several supply structural elements lie essentially flat on top of each other. In the use position, the supply structural elements adjoin one another with regard to their longitudinal direction. The individual supply structural segments are unfolded via joints until the supply structure extends along a height of the tower. The erection of the supply structure and thus of the tower as well becomes very easy as a result of this. The supply structure is preferably executed according to the previous and/or following description, wherein the above-mentioned features can be individually present or in any combination.

In the method, it is advantageous if the supply structure is moved first from the folded assembly position to an unfolded connecting position. In the connecting position, the several supply structural segments adjoin one another with regard to their longitudinal direction. In this already unfolded connecting position, the supply structure is fastened in a suspended way to the tower or tower section, especially to an adapter platform. Naturally, the supply structure can also be fastened in a suspended way to another structural part of an adapter piece of the tower or also to another structural part of the tower or tower section. Thus, in connecting position, the supply structure is suspended largely perpendicularly in the interior of the tower and can then be moved from this connecting position to its use position in which it preferably extends section by section parallel to the wall of the tower or tower section.

A tower with several tower segments is also suggested, wherein the tower is executed according to the previous and/or following description, wherein the above-mentioned features can be individually present or in any combination. The tower is preferably a wind turbine tower.

BRIEF DESCRIPTION OF THE DRAWINGS

Additional advantages of the disclosure are described in the following figures.

DETAILED DESCRIPTION

Figure 1:
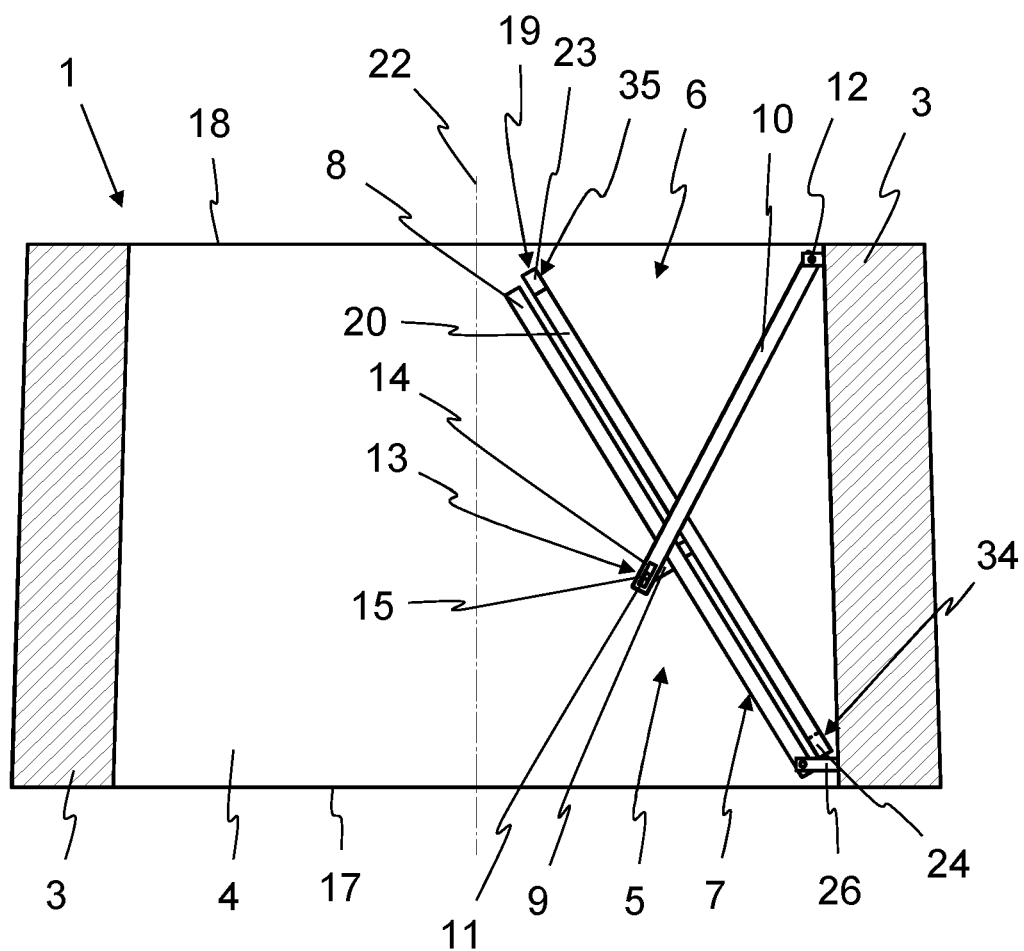
FIG. 1 is a schematic lateral view of a tower segment with a supply structural segment in an assembly position in a sectional view.
Figure 4:
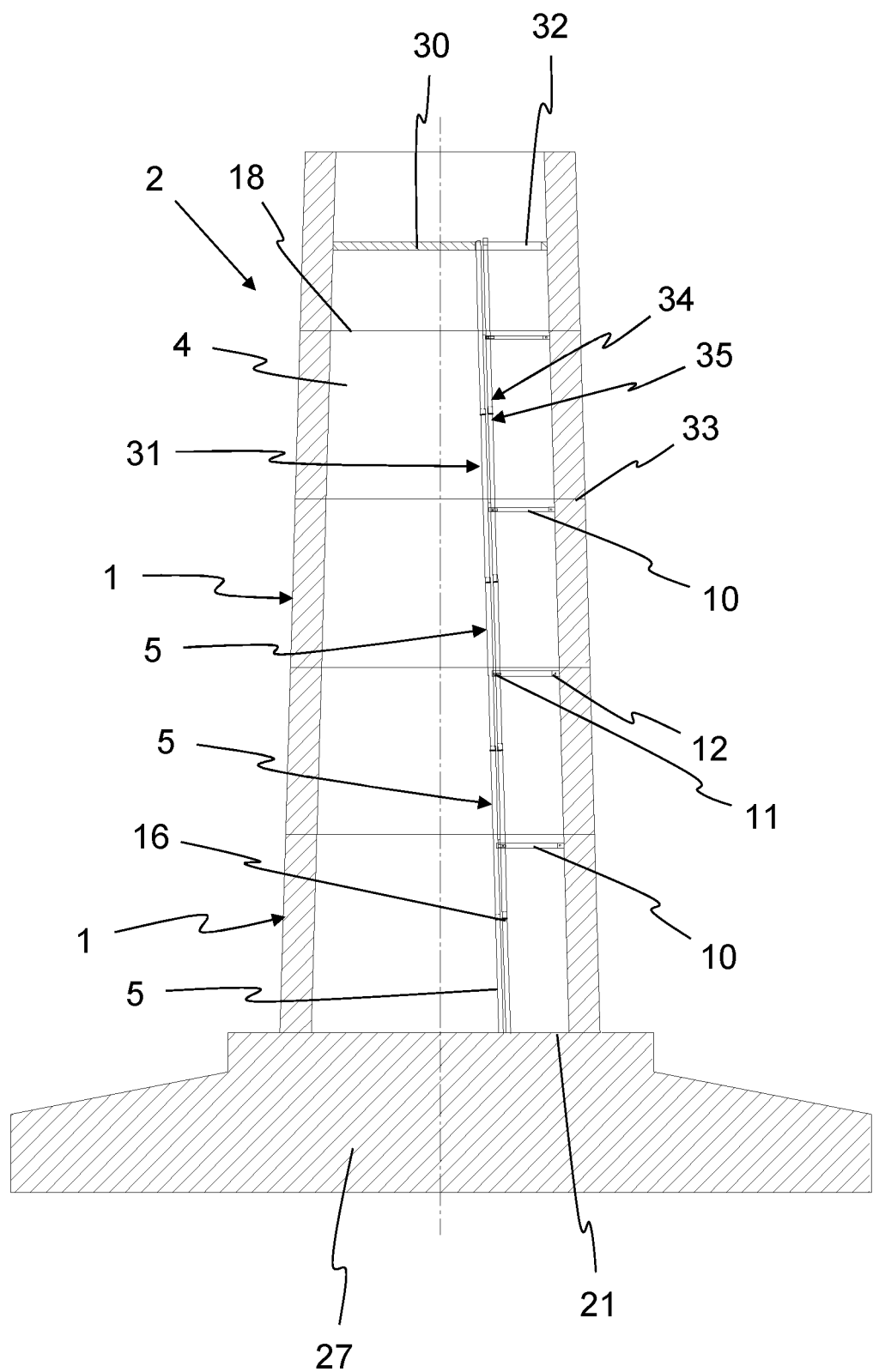
FIG. 4 is a schematic lateral view of several tower segments arranged on top of one another according to another method step in a sectional view.

FIG. 1 shows a tower segment 1 executed for building a tower 2 according to FIG. 4. The tower segment 1 is preferably a prefabricated concrete part. In a top view, individual tower segments 1 can be polygonal, circular or have the shape of a circular segment. The tower segment 1 has an interior 4 bounded by a wall 3, in which a supply structural segment 5 is arranged for fastening interior components (not shown). The supply structural segment 5 extends along a longitudinal axis 22 of the tower segment 1. Such interior components typically include components for the ongoing operation, just like components for assembly and maintenance purposes. For example, the internal installations can include ladders, wiring, power cables, lighting elements, elevators and the like. In FIG. 1, the supply structural segment 5 is arranged here in an assembly position 6, in which the supply structural segment 5 extends at an angle to the wall 3. Thus, the supply structural segment 5 is fully arranged inside the tower segment 1 in spite of its length, which largely corresponds to a height of the tower segment 1, and it neither projects above it at the upper edge 18 nor at the lower edge 17.

Here, the supply structural segment 5 comprises a supply scaffolding 7, which has at least one vertical strut 8. Preferably, two vertical struts 8 arranged parallel to one another are interconnected at least by means of a horizontal strut 9, so that an essentially stable supply scaffolding 7 is provided. To connect several vertical struts 8 to one another, they are preferably executed in an L-shaped profile and/or have a connecting piece or head plates in their longitudinal ends for screwing them together. To stabilize the supply scaffolding 7, diagonal struts can be provided (not shown) to connect the corners of the supply scaffolding 7 together and provide additional stability.

Furthermore, the supply structural segment 5 includes at least one fastening strut 10, which connects the supply scaffolding 7 to the wall 3 of the tower segment 1. Preferably, one fastening strut 10 is arranged in each case on the ends of the horizontal strut 9. So the supply structural segment 5 can be moved relative to the wall 3, the fastening strut 10 is equipped with two joints 11, 12. A first joint 11 connecting the fastening strut 10 to the supply scaffolding 7 allows the supply scaffolding 7 to be swiveled relative to the fastening strut 10. A second joint 12 connects the fastening strut 10 in such a way to the wall 3 that the fastening strut 10 can be folded upwards and downwards relative to the wall 3.

A tolerance compensation element, executed here in form of a guidance system 13, is executed here between the fastening strut 10 and the supply scaffolding 7 or supply structural segment 5, so that tolerances can be compensated when several supply scaffoldings 7 or supply structural segments 5 are connected to each other. The guidance system 13 comprises a first part 14 and a second part 15 connected in such a way to one another that the supply scaffolding 7 is movable in a transverse direction (i.e. perpendicularly to the longitudinal axis 22 and/or wall 3) to the tower segment 1. The first part 14 is preferably an elongated hole preferably executed on the fastening strut 10 and in which the second part 15, especially a screw, is movably arranged. The second part 15 is connected to the supply scaffolding 7, so that the displacement of the second part 15 to the first part 14 is transferred to it. Preferably, the first part 14—here the elongated hole—and the second part 15—here the screw—are simultaneously the first joint 11.

So the supply structural segment 5 can be held in the assembly position 6, it is additionally secured to the wall 3 by means of a fastening element 26. The fastening element 26 prevents the supply scaffolding from swiveling around the two joints 11, 12. To move the supply structural segment 5, the fastening element 26 is detachably designed so it can be removed from between the wall 3 and the respective supply structural segment 5.

The supply structural segment 5 furthermore includes a ladder segment 19 arranged between the supply scaffolding 7 and the wall 3 of the tower segment 1. The ladder segment 19 has adjusted rungs (not shown) between two hollow profile-shaped stiles 20 for ascending and descending. In the assembly position 6, the ladder segment 19 or supply scaffolding 7 extends essentially obliquely to the longitudinal axis 22, especially at an angle between 15° to 60°, preferably between 20° and 45°, and also to the wall 3 of the tower segment 1, which in a conical tower segment 1 can be inclined at an angle of up to 15° relative to the longitudinal axis 22. On their end facing an upper edge 18 of the tower segment 1, the stiles 20 have in each case a connecting element 23 executed in a way allowing the transfer of horizontal and/or tensile forces. On their end facing a lower edge 17 of the tower segment 1, the stiles 20 have a connecting element holding space 24. Likewise, the arrangement of connecting element 23 and connecting element holding space 24 can be reversed. To connect several ladder segments 19 to one another (cf. FIGS. 2 to 4), the connecting elements 23 of the ladder segments 19 of the one tower segment 1 are introduced into the connecting element holding spaces 24 of the stiles 20 of the ladder segment 19 of the other tower segment 1 and connected in a force-fitting manner if necessary. The connecting elements 23 are preferably incorporated into the connecting element holding spaces 24 of the stiles 20 in a form- and/or force-fitting manner. This procedure applies analogously to fall protection elements that are generally pre-mounted along the ladder segments 19 and connected to one another in a force-fitting manner.

According to an alternative embodiment (not shown), the ladder segment 19 is directly connected to the fastening struts 10. In this case, the supply structural segment 5 is largely executed by the ladder segment 19 alone. The second part 15 of the guidance system 13 is then fastened to one or several of rungs and/or stiles 20 of the ladder segment 19.

According to the execution of FIG. 1, the supply structural segment 5 is introduced in assembly position 6 into the tower segment 1 so it neither projects above the lower edge 17 nor above the upper edge 18 of the tower segment 1. When the tower 2 is built, the individual tower segments 1 can be mounted on top of one another without the projecting structural parts interfering with the assembly when placed on top.

Figure 2:
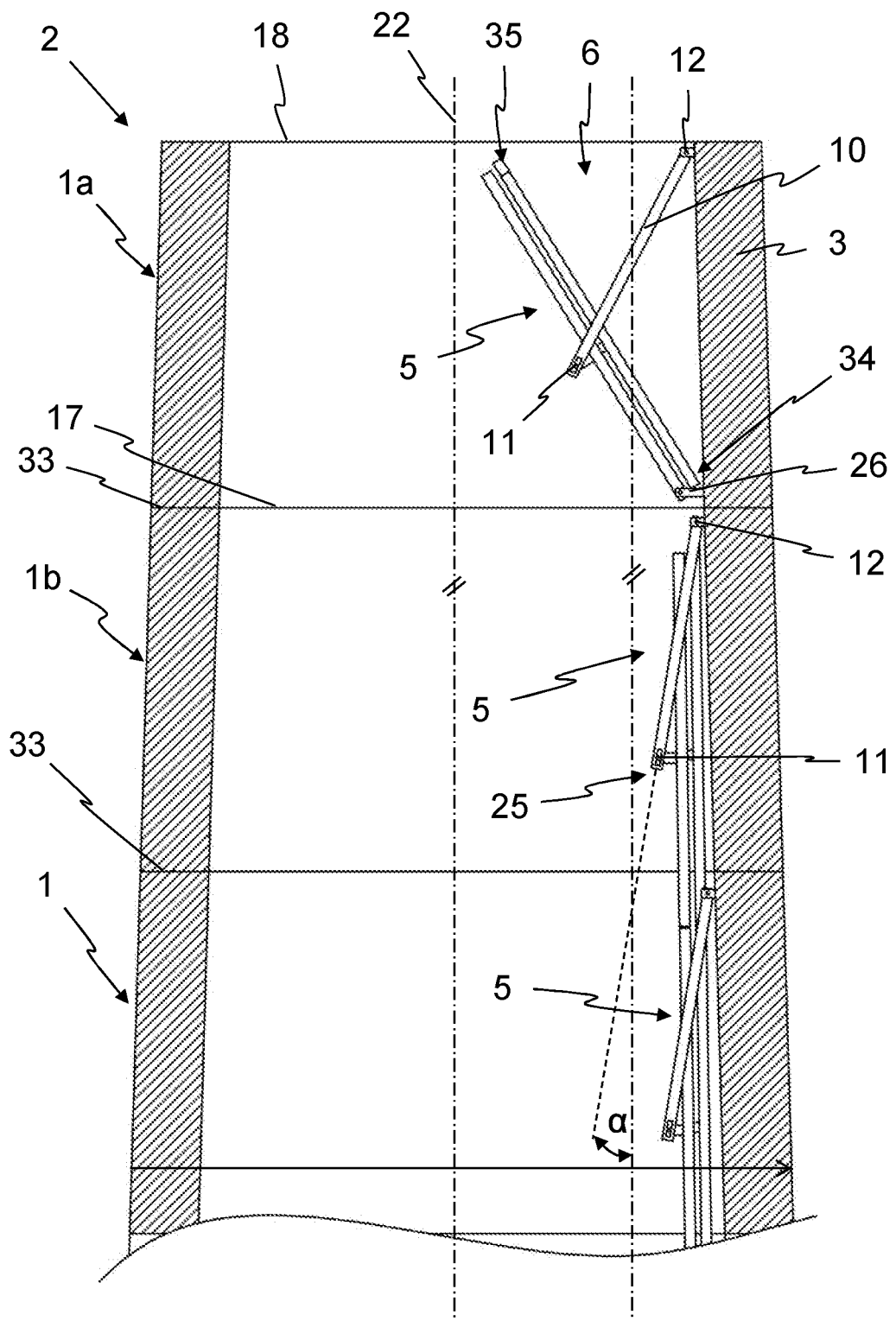
FIG. 2 is a schematic lateral view of several tower segments arranged on top of one another according to a method step in a sectional view.

FIG. 2 shows several tower segments 1 arranged on top of one another while forming horizontal joints 33 towards the tower 2. To erect the tower 2 using the tower segments 1, an upper tower segment 1a is arranged in each case on a lower tower segment 1b. In the tower segments 1a, 1b, a supply structural segment 5 has been pre-mounted in each case. The supply structural segment 5 of the upper tower segment 1a is shown in assembly position 6, in which the supply structural segment 5 neither projects above the upper edge 18 nor above the lower edge 17 of the tower segment 1a.

Here, the fastening element 26 is arranged between the wall 3 and the supply structural segment 5 of the upper tower segment 1a. The upper tower segment 1a can thus be easily mounted on the lower tower segment 1b with a crane (not shown), without the projecting structural parts interfering with the assembly during placement above the lower edge 17 of the upper tower segment 1a.

A supply structural segment 5, which is in a connecting position 25, has also been arranged in the lower tower segment 1b. According to this execution, in the connecting position 25, the supply structural segment 5 projects above the lower edge 17 of the lower tower segment 1b. Furthermore, in the connecting position 25, the fastening strut 10 encloses an acute angle α with the longitudinal axis 22 of the tower segment 1. Here, for clarity reasons, the angle α between the fastening strut 10 and a parallel to the longitudinal axis 22 has been marked.

In FIG. 2, an additional lower tower segment 1 is arranged below the lower tower segment 1b. In the connecting position 25, the lower end 34 of the supply structural segment 5 of the lower tower segment 1b is connected to the upper end 35 of the supply structural segment 5 of the tower segment 1 lying below. Preferably, the L-shaped vertical struts of the supply structural segments 5 of the lower tower segment 1b and the tower segment 1 lying below are screwed together in the connecting position 25. Here, the connecting element holding spaces 24 of the lower tower segment 1b and the connecting elements 23 of the tower segment 1 lying below are interlocked (cf. FIG. 1, since the connecting point between the supply structural segments 5 is not apparent in FIG. 2). Here, the connecting point between the individual supply structural segments 5 is in each case somewhat below the assigned horizontal joint 33.

So the supply structural segment 5 of the upper tower segment 1a can be swiveled to the connecting position 25, the fastening element 26 (cf. FIG. 1) between the supply structural segment 5 and the wall 3 is detached at first. Then, the supply structural segment 5 is swiveled around both joints 11, 12 so that it now lies in the connecting position 25 just like the supply structural segments 5 of the tower segments 1, 1b lying below and can be attached to the supply structural segment 5 of the lower tower segment 1b. In this execution, the supply structural segment 5 in the connecting position 25 is now parallel to the wall 3 of the tower segment 1a assigned to it and is at a relatively short distance to it.

To summarize, the tower segments 1 are equipped with the supply structural segments 5 in the factory or at ground level on the construction site, so that they are in the assembly position 6 when the tower segments 1 are ready on the construction site. After such a tower segment 1 is mounted on another tower segment 1, the supply structural segment 5 of the tower segment 1 is swiveled into the connecting position 25 and a lower end 34 of the supply structural segment 5 is connected to the upper end 35 of the supply structural segment 5 of the other tower segments 1 lying below, so that the connecting position 25 is taken. Several tower segments 1, in which the supply structural segments 5 are arranged in each case in the connecting position 25, are joined together and shown in FIG. 3.

Figure 3:
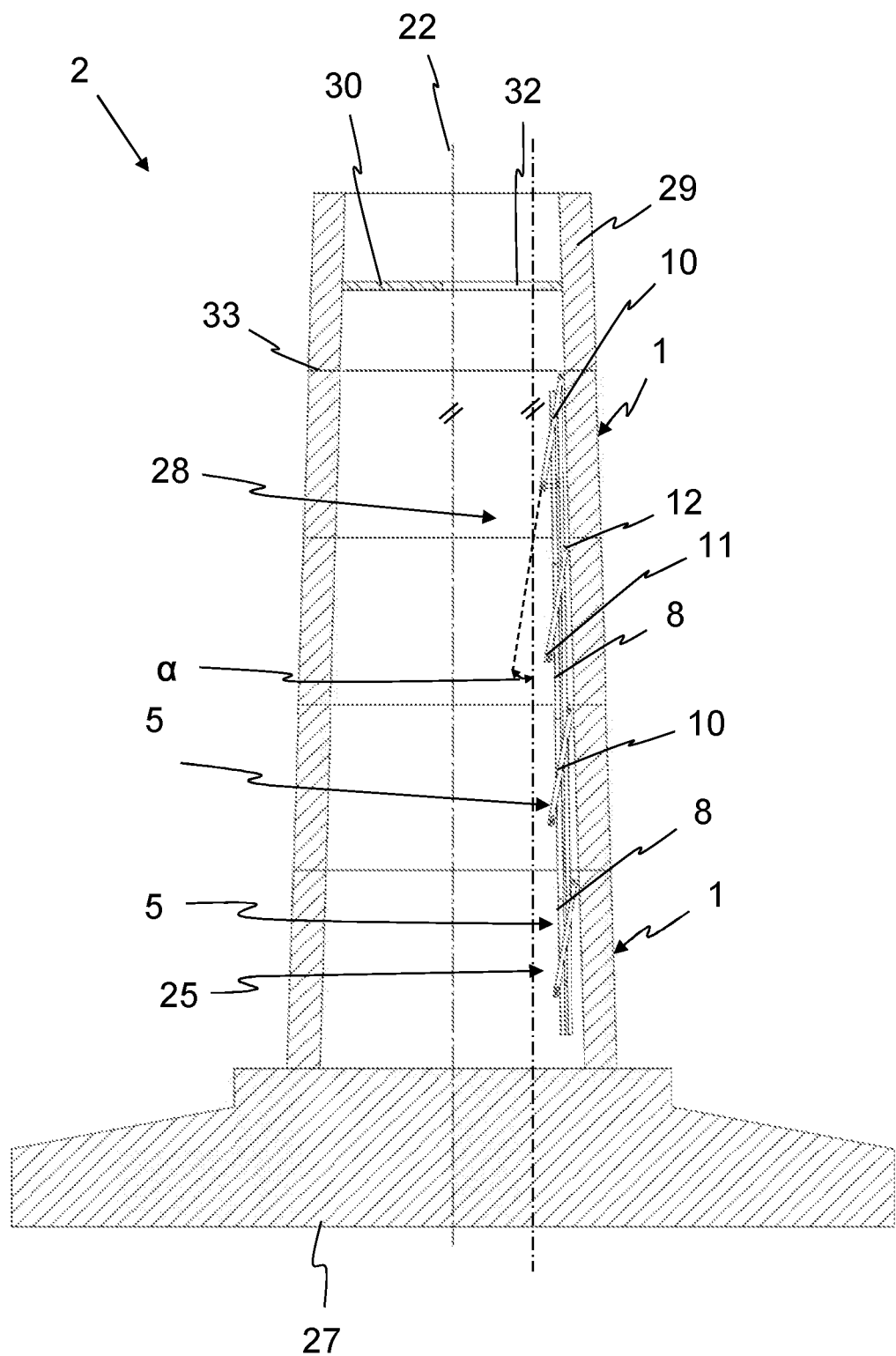
FIG. 3 is a schematic lateral view of several tower segments arranged on top of one another according to another method step in a sectional view.

In FIG. 3, several tower segments 1 are arranged on top of one another and a lowest tower segment 1 is placed on a foundation 27 of the tower 1. The lowest tower segment 1 is also arranged on the foundation 27 with a supply structural segment 5 arranged, if necessary shortened, in the assembly position 6 (cf. FIG. 1). After the lowest tower segment 1 has been placed, the fastening element 26 (cf. FIGS. 1 and 2) between the wall 3 and the supply structural segment 5 is detached, so that the supply structural segment 5 can be moved in the connecting position 25, wherein it is swiveled around both joints 11, 12. Afterwards, as described based on FIGS. 1 and 2, additional tower segments 1 are arranged on the lowest tower segment 1 as corresponding upper tower segments 1a (see FIG. 2), wherein they are initially placed in each case in the assembly position 6 (cf. FIGS. 1 and 2) on the corresponding lower tower segment 1b (see FIG. 2), then the fastening element 26 is detached and wherein the supply structural segment 5 is subsequently moved to the connecting position 25. In the connecting position 25, the supply structural segments 5 arranged in each case one below the other, especially their vertical struts 8, are joined together. These steps are repeated until the tower 1 has reached a target height. By joining the individual supply structural segments 5 together, a supply structure 28 is formed that extends along a height of the tower 2 or along the longitudinal axis 22 of the individual tower segments 1. Since in the connecting position 25, the supply structural segments 5 or the entire supply structure 28 already extend parallel to a wall 3 of the tower segments 1 or, in the case of a linear tower wall, also parallel to a wall 3 of the entire tower 2, assemblers can already climb from the foundation 27 to one of the uppermost tower segments 1 immediately after the supply structure 28 is placed in the use position 31 (s. FIG. 4), described below.

Once the target height of the tower 1 or especially of the supply structure 28 is reached, an adapter piece 29 is placed on the uppermost tower segment 1. Like a tower segment 1, the adapter piece 29 is executed as a prefabricated concrete part for joining to another tower section, made of steel for example, or also to a nacelle of a wind turbine. An adapter platform 30 has been arranged in the adapter piece 29, which after the adapter piece 29 has been placed on the uppermost tower segment 1, is lifted onto it and fastened there. The adapter platform 30 runs essentially perpendicularly to the longitudinal axis 22 of the tower 1. In the adapter platform 30, an opening 32 for climbing through has been executed and arranged in such a way that someone can climb from the supply structure 28 directly to the adapter platform 30.

In FIG. 3, the supply structure 28 is or the individual supply structural segments 5 are arranged in the connecting position 25, in which the individual supply structural segments 5 are arranged folded downward around the respective joints 11, 12. Thus, the supply scaffoldings 7 and their ladder segments 19 extend preferably in the connecting position 25 in essentially parallel fashion to the wall of the tower segments 1.

On the other hand, FIG. 4 shows the tower 1 with a supply structure 28 arranged in a use position 31. Also in the use position 31, the supply structural segments 5 with the supply scaffoldings 7 and the ladder segments 19 extend preferably parallel to the wall 3 or at a slight angle to it. The supply structure 28 is lifted and swiveled out of the connecting position 25 around the individual joints 11, 12 in the use position 31 and fastened onto the adapter platform 30. In the swiveling procedure, care must be taken that the fastening struts 10 in the connecting position take the correct angle α (see FIG. 2) relative to the longitudinal axis 22 to prevent the supply structural segments 5 from tilting on the fastening struts 10.

As is apparent when comparing with FIG. 2, the supply structural segments 5 or the supply scaffoldings 7 and their ladder segments 19 are at a greater distance to the wall 3 in the use position 31 than in the connecting position. According to this drawing, the individual supply structural segments 5 in their corresponding use position 31 project above the upper edge 18 of the respectively assigned tower segment 1 with their upper end 35. The fastening strut 10 extends essentially horizontally and thus perpendicularly to the longitudinal axis 22 of the tower 1 in the interior 4 of the tower 2. Between the wall 3 and the supply structure 28 or the supply structural segment 5 and the fastening strut(s) 10, a clearance 38 is formed inside which an elevator cabin and, when necessary, also additional internal installations can be arranged. It is advantageous if cable ducts are fastened outside this clearance 38, i.e. on the external side or on the side of the supply structural segments 5 or fastening struts 10 that faces away from the clearance 38, as this facilitates the installation of the cables.

Finally, another bottom supply structural segment 5 is arranged between a lower end 16 of the supply structure 28 and the foundation 27, which continues the supply structural segments 5 arranged on top to a surface 21 of the foundation 27.

Figure 5A:
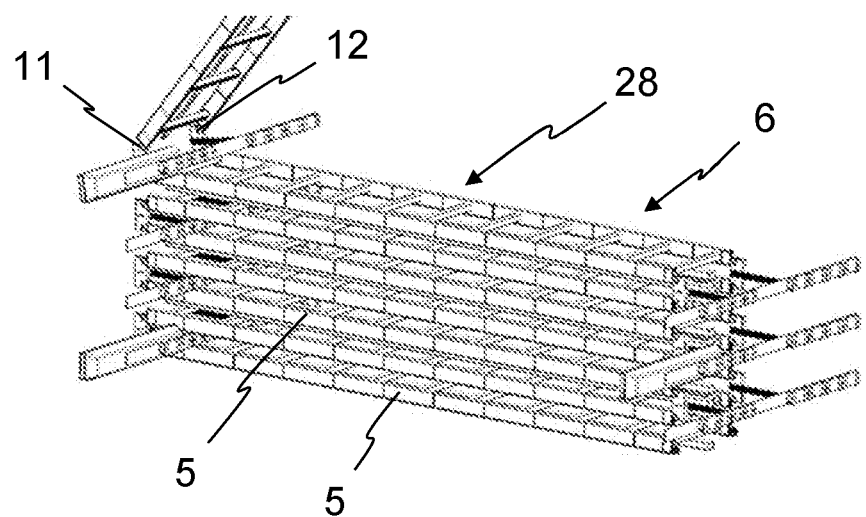
FIG. 5a is a schematic lateral view of a supply structure in an assembly position according to an alternative embodiment.
Figure 5B:
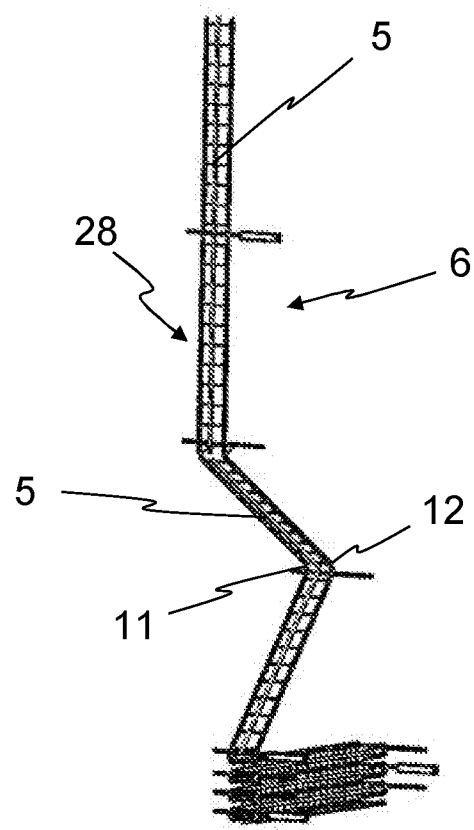
FIG. 5b is a schematic lateral view of the supply structure according to FIG. 5a, while it is moved to a use position.
Figure 7:
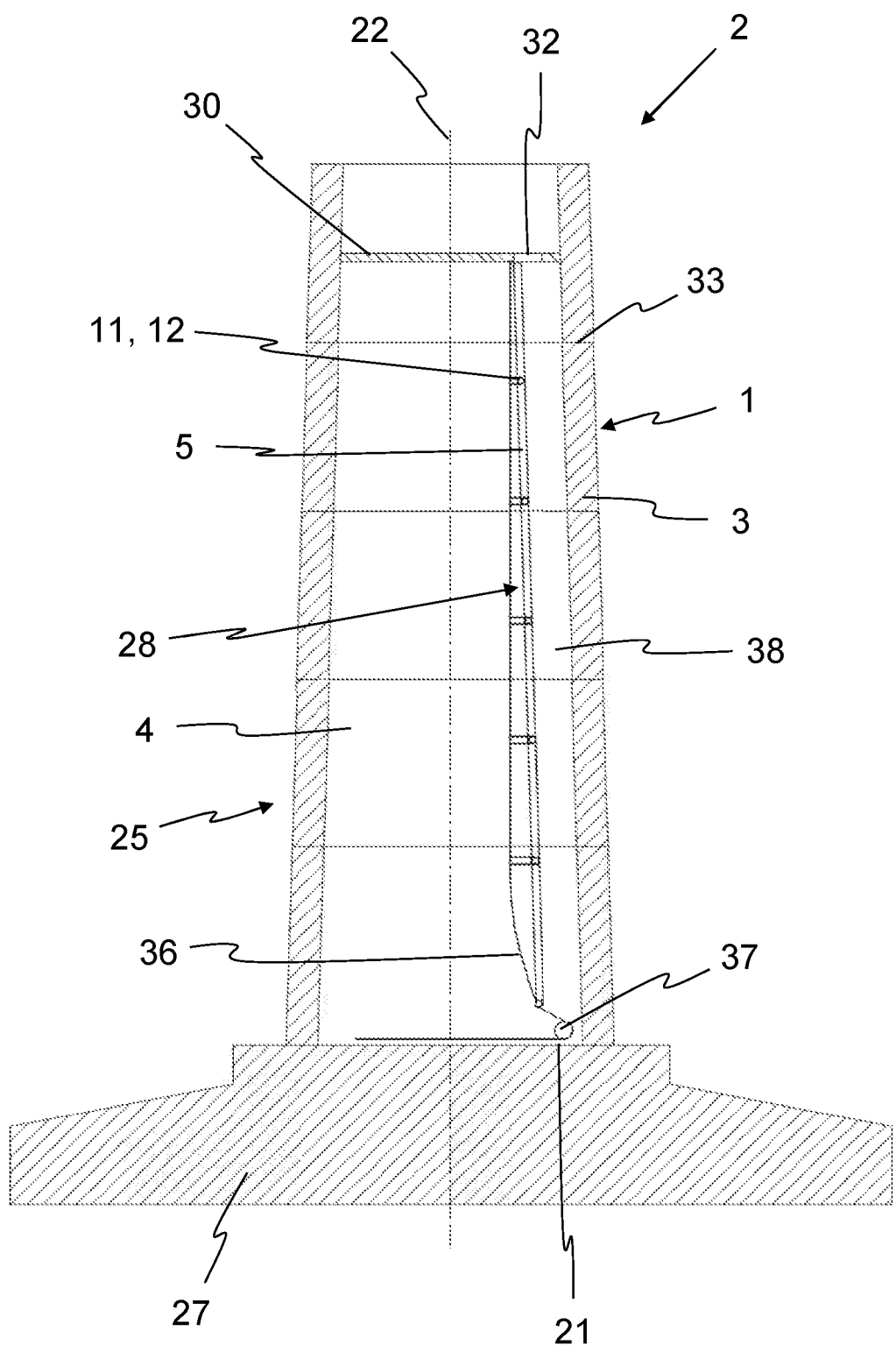
FIG. 7 is a schematic lateral view of the supply structure according to FIG. 5a in a connecting position.

FIGS. 5a, 5b and 7 show an alternative embodiment of the supply structure 28, wherein the same reference signs are used for features whose design and/or mode of operation are identical and/or at least similar compared to the embodiment shown in FIGS. 1 to 4. If they are not explained in detail once again, their design and/or mode of operation corresponds to the design and/or mode of operation of the features already described above.

The supply structure 28 has several supply structural segments 5 joined together. Two supply structural segments 5 at a time are joined together by means of joints 11, 12, so that the supply structure 5 can be folded together in the assembly position 6. The supply structure 28 that is in the assembly position 6 according to FIG. 5a is lifted in the folded state to the already erected tower 2. Alternately, before erecting the tower 2, the supply structure 28 is placed on the foundation 27 and then the tower 2 is erected.

Once the target height of the tower 2 is reached, the supply structure 28 is lifted from the assembly position 6 to the unfolded use position 31 (not shown here) and joined to the adapter platform 30 of the tower 2 according to FIG. 4. This state is shown in FIG. 5b, wherein the use position 31 has not been reached yet. The joints 11, 12, around which the supply structural segments 5 are lifted from the assembly position 6 to the use position 31, are executed as double joints.

Supporting elements to secure and guide an elevator are preferably arranged on the supply structure 28.

To move the supply structure 28 from the assembly position shown in FIG. 5a to the use position 31 (not shown), the supply structure 28 is preferably moved to an unfolded connecting position 25 first, as shown in FIG. 7.

In the connecting position 25, the supply structure 28 is fastened to the tower 2 or tower section in a suspended way, as described above, and only then pulled to the use position 31, in which the supply structure 28 extends towards the wall 3, as shown similarly in FIG. 4. To do this, a rope 36 fastened to the supply structure 28 in the area of each joint 11, 12 is connected to the suspended supply structure 28. Here, the rope 36 is preferably fastened to the supply structure 28 in each case just above and additionally just below the joints 11, 12, thereby stiffening it in its longitudinal direction. On the lower end of the supply structure 28, the rope 36 is guided around a pulley 37 arranged close to the wall 3. Thus, by pulling on the end of the rope 36, it is possible now to pull the supply structure 28 from the connecting position 25, in which it essentially hangs down perpendicularly, to the use position 31, in which the supply structure 28 extends parallel to the wall 3.

Figure 6:
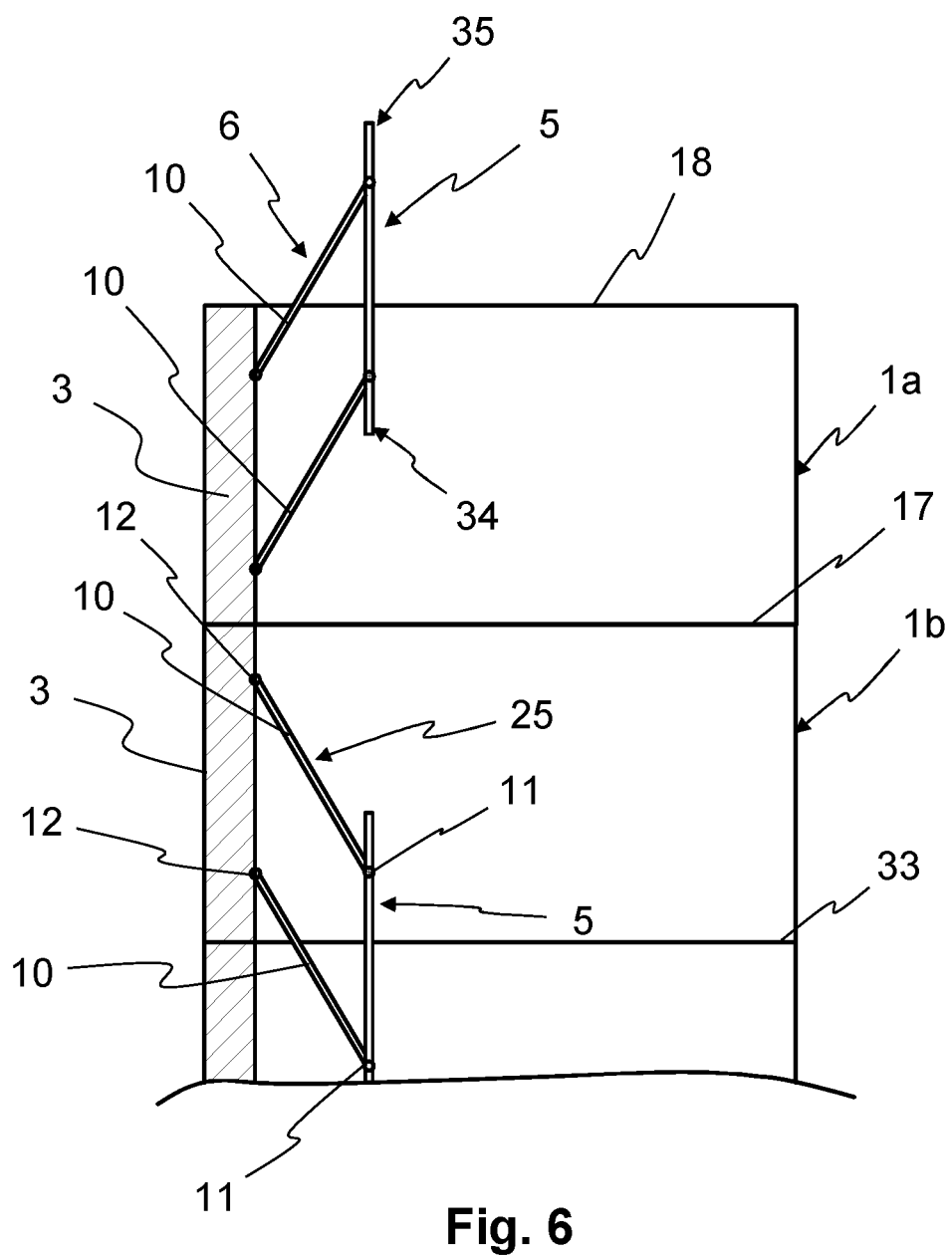
FIG. 6 is a schematic lateral view of two tower segments with an alternative supply structure.

FIG. 6 shows a second alternative embodiment of the tower segment 1 with the supply structural segment 5, wherein for features that compared to the embodiments shown in the previous figures have the identical and/or at least a similar design and/or mode of operation, the same reference signs are used. If they are not explained in detail once again, their design and/or mode of operation corresponds to the design and/or mode of operation of the features already described above.

In FIG. 6, two tower segments 1a and 1b are arranged on top of each other. The supply structural segment 5 of the upper tower segment 1a is in an assembly position 6 and the supply structural segment 5 of the lower tower segment 1b is in a connecting position 25. In the assembly position 6, the supply structural segment 5 projects above an upper edge 18 of the tower segment 1a, but not its lower edge 17. This makes it possible to place the upper tower segment 1a on the lower tower segment 1b without having to consider the structural parts that are above the lower edge 17.

After placing the upper tower segment 1a on the lower tower segment 1b, the supply structural segment 5 is folded from the assembly position 6 to the connecting position 25 and a lower end 34 of the supply structural segment 5 is joined to an upper end 35 of the supply structural segment 5 of the lower tower segment 1b. Here, an intermediate piece (not shown) can be arranged between both supply structural segments 5 to join the two indirectly together. Likewise, a tolerance compensation element can be provided. As described above, the supply structural segments 5 can be connected to the connecting elements 23 and connecting element holding spaces 24. Alternately, the supply structural segments 5 are directly joined together, especially screwed together.

Contrary to the embodiment shown in FIGS. 1 to 4, the supply scaffolding according to FIG. 6 is fastened to the wall 3 of the respective tower segment 1a, 1b with two fastening struts 10. A first joint 11 and a second joint 12 are assigned to each fastening strut 10, so that they can be swiveled both relative to the wall 3 and also relative to the supply structural segment 5. As a result of this, the supply structural segment 5 is both in the assembly position 6 and in the connecting position 25, and in the use position 31 (not shown here) it is parallel to the wall 3 of the tower segment 1a or to the wall 3 of the tower 2. In the use position 31, the fastening struts 10 extend likewise essentially horizontally or perpendicularly to the longitudinal axis 22 of the tower 1 in the interior 4 of the tower 2. Moreover, in the use position 31, the supply structural segment 5 is also at a greater distance to the wall 3 than in the connecting position.

Preferably, the joints 11, 12 can be locked so the supply structural segment 5 can be held in the assembly position 6, connecting position 25 and/or use position 31.

The present disclosure is not limited to the embodiments shown and described. Variations within the framework of the patent claims are just as possible as a combination of the features, even if they are shown and described in various embodiments.

LIST OF REFERENCE NUMERALS

1 Tower segment
1a Upper tower segment
1b Lower tower segment
2 Tower
3 Wall
4 Interior
5 Supply structural segment 6 Assembly position
7 Supply scaffolding
8 Vertical strut
9 Horizontal strut
10 Fastening strut
11 First joint
12 Second joint
13 Guidance system
14 First part of the guidance system
15 Second part of the guidance system
16 Lower end of the supply structure
17 Lower edge
18 Upper edge
19 Ladder segment
20 Stile
21 Surface
22 Longitudinal axis
23 Connecting element
24 Connecting element holding space
25 Connecting position
26 Fastening element
27 Foundation
28 Supply structure
29 Adapter piece
30 Adapter platform
31 Use position
32 Opening
33 Horizontal joint
34 Lower end of a supply structural segment
35 Upper end of a supply structural segment
36 Rope
37 Pulley
38 Clearance
α Angle between fastening strut and longitudinal axis

The invention claimed is:

1. A method for erecting at least a section of a tower including a plurality tower segments arranged one atop another with a given upper tower segment and a given lower tower segment forming a horizontal joint therebetween, each tower segment within the section including a supply structural segment preassembled thereon, the supply structural segments configured to be joinable to create a supply structure extending along a longitudinal axis extending along a height of the at least a section of the tower defined by the given upper tower segment and the given lower tower segment, the supply structural segments being fastened to the tower segment with at least one fastening strut, the fastening strut being connected to the supply structural segment via a first joint and to a wall of the tower segment via a second joint, the method including the steps of:
   arranging the supply structural segment of a given upper tower segment in an assembly position in which the supply structural segment is arranged, relative to the longitudinal axis, fully inside the tower segment, and in which the supply structural segment extends at an angle to and not parallel to the wall;
   placing the given upper tower segment on a given lower tower segment while the supply structural segment of the given upper tower segment is in the assembly position;
   moving the supply structural segment of the given upper tower segment from the assembly position to a connecting position by swiveling the first joint and the second joint; and
   connecting the supply structural segment of the given upper tower segment to the supply structural segment of the given lower tower segment.

2. The method according to claim 1, wherein when in the connecting position, a lower end of the supply structural segment of the given upper tower segment is proximate the horizontal joint between the given upper tower segment and the given lower tower segment.

3. The method according to claim 1, wherein the steps of arranging, placing, moving, and connecting are completed until a target height of the at least a tower section is reached, and the supply structural segments are then moved to a use position.

4. The method according to claim 3, wherein each supply structural segment is swiveled by at least one of the first joint and the second joint to move the structural supply segment from the assembly position to one of the connecting position and the use position.

5. The method according to claim 1, wherein a lower end of the supply structural segment in a given upper tower segment forms a connecting point with an upper end the supply structural segment in a given lower tower segment, and wherein a tolerance compensation element is located at the connecting point.

6. A section of a tower comprising:
   a tower segment defining an interior, a longitudinal axis, and a wall; and
   a supply structural segment preassembled in the interior of the tower segment extending along the longitudinal axis of the tower segment, wherein the supply structural segment is movable relative to the tower segment and connected to the wall of the tower segment so that the supply structural segment can be moved at least from an assembly position to a connecting position, wherein the supply structural segment is fastened to the tower segment with at least one fastening strut, the fastening strut being connected to the supply structural segment via a first joint and to the wall of the tower segment via a second joint, the first joint and the second joint configured to permit swiveling between their respective connections;
   wherein when the supply structural segment is in the assembly position, relative to the longitudinal axis, the supply structural segment is fully arranged inside the tower segment, and the supply structural assembly extends at an angle to and not parallel to the wall.

7. The section of a tower according to claim 6, wherein in the connecting position a lower end of the supply structural segment projects below a lower edge of the tower segment with regard to the longitudinal axis.

8. The section of a tower according to claim 6, wherein the supply structural segment is movable to a use position.

9. The section of a tower according to claim 6, wherein the supply structural segment is attached to the wall of the tower segment via the first joint and the second joint.

10. The section of a tower according to claim 6, wherein in the connecting position the at least one fastening strut encloses an acute angle (a) with the longitudinal axis.

11. The section of a tower according to claim 6, wherein a tolerance compensation element is located between the at least one fastening strut and the supply structural segment.

12. The section of a tower according to claim 6, wherein the supply structural segment is movable to a use position in which the supply structural segment extends parallel to the wall of the tower segment, in the use position the supply structural segment and the at least one fastening strut enclosing a clearance with the wall, on at least a side of the supply structural segment facing away from the clearance a receiving space for a supply line is defined.

13. The section of a tower according to claim 6, wherein the supply structural segment is rigidly held in the assembly position by a temporary fastening element.

14. The section of a tower according to claim 6, and further including a supply structure extending along a height of the section of the tower, the supply structure including the supply structural segment, the second joint configured for movable connection of the fastening strut to the wall of the tower segment.

15. A supply structure for at least a section of a tower, the section including at least one tower segment having a longitudinal axis and a wall, the supply structure comprising:
  a supply structural segment; and
  at least one fastening strut fastening the supply structural segment to the tower segment, the fastening strut being connected to the supply structural segment via a first joint configured to be swivelable, the fastening strut having a second joint configured for swivelable connection of the fastening strut to the wall of the tower segment;
  the supply structural segment placeable in an assembly position in which the supply structural segment is arranged relative to the longitudinal axis fully inside the tower segment, and in which the supply structural segment extends at an angle to and not parallel to the wall.

16. A supply structure for at least a section of a tower, the section including a plurality of tower segments arranged one atop another, the supply structure comprising:
  several supply structural segments joined together for attachment to the section of the tower, wherein each given pair of the supply structural segments are joined together and are swivelable via joints so that the supply structure can be folded together to an assembly position in which the several supply structural segments: a) lie essentially flat on top of one another in a stack in an alternating fashion with the joints on outer ends of the stack, the stack configured to fit inside the at least a section of the tower; b) can be unfolded from the assembly position to a connecting position in which the supply structure is fastened to the at least a section of the tower; and c) can be unfolded from the connecting position to a use position in which the several supply structural segments adjoin one other with regard to a longitudinal direction of the several supply structural segments, the supply structural segments configured for attachment to the tower in the use position.

17. A method for erecting a supply structure in an interior of at least a section of a tower including several tower segments, the supply structure including several supply structural segments joined together by swivelable joints, the method comprising the steps of:
  configuring the supply structure in a folded assembly position in which the several supply structural segments lie essentially flat one atop another in a stack in an alternating fashion with the joints on outer ends of the stack;
  introducing the supply structure into the interior of the at least a section of the tower, while the supply structure is in the folded assembly position;
  moving the supply structure from the folded assembly position to a connecting position in which the supply structure is fastened to the at least a section of the tower; and
  moving the supply structure from the connecting position to an unfolded use position in which the several supply structural segments adjoin one another with regard to a longitudinal direction of the several supply structural segments and are attached to the tower, the supply structural segments being unfolded via the joints until the supply structure extends along a height of the at least a section of the tower.

* * * * *